United States Patent [19]
Lechler

[11] Patent Number: 4,530,249
[45] Date of Patent: Jul. 23, 1985

[54] DYNAMOMETER DEVICE

[76] Inventor: Gerhard Lechler, Mühlenstrasse 58, D-1000 Berlin 46, Fed. Rep. of Germany

[21] Appl. No.: 593,815

[22] Filed: Mar. 27, 1984

[30] Foreign Application Priority Data

Apr. 12, 1983 [DE] Fed. Rep. of Germany ....... 3313620

[51] Int. Cl.$^3$ ................................................. G01L 5/12
[52] U.S. Cl. .............................. 73/862.54; 73/862.67; 338/3; 374/142
[58] Field of Search ........... 73/862.63, 862.65, 862.54, 73/862.49, 862.67, 766; 374/188, 142, 143; 338/3, 5

[56] References Cited

U.S. PATENT DOCUMENTS 3,354,716  11/1967  Wiebe et al. ........................ 374/142
4,448,078   5/1984  Bridges ................................. 73/766

FOREIGN PATENT DOCUMENTS 0570751  7/1945  United Kingdom .................. 73/766
0216347  4/1968  U.S.S.R. .............................. 374/142
0238853  3/1969  U.S.S.R. .............................. 374/142

Primary Examiner—Donald O. Woodiel
Attorney, Agent, or Firm—F. Eugene Davis, IV; Mark P. Stone

[57] ABSTRACT

In a device for measuring forces by means of an anti-friction bearing which is provided with strain gauges at various measurement points, which serve to detect overroll extensions, two strain gauges connected as a half-bridge are used in each case, which are adapted to materials with different coefficients of expansion. By the use of such different strain gauges, temperatures and forces can be measured with one and the same measuring device, while force-dependent alternating-voltage fractions appearing at the center tapping of the half-bridge are filtered out of the total signal by a filter.

10 Claims, 3 Drawing Figures

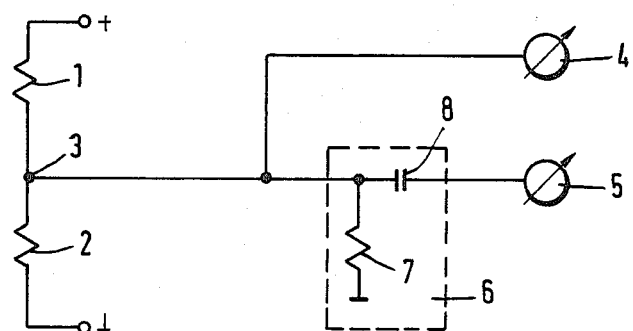
F i g.1
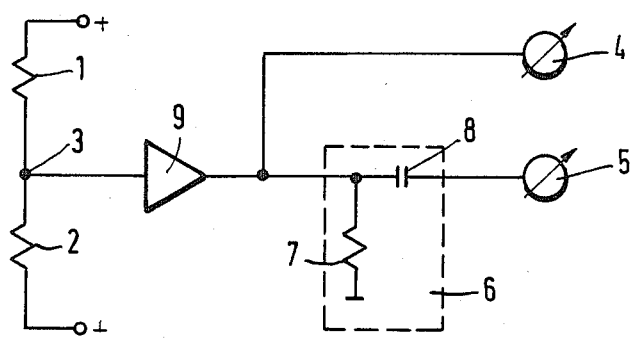
F i g.2
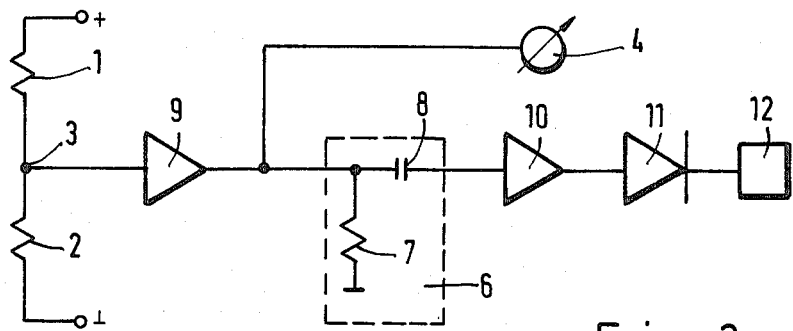
F i g.3

DYNAMOMETER DEVICE

BACKGROUND OF THE INVENTION

The invention relates to a device for measuring forces by means of at least one anti-friction bearing, the outer ring and/or inner ring of which are or is provided with strain gauges arranged at different measurement points, which serve to detect overroll extensions, whilst at least two strain gauges are connected as a half-bridge in each case.

Devices of the above type with three, four or more strain gauges are known from German Patent No. 2,911,479. In the known devices, strain gauges are used which are all adapted to a material with the same coefficient of expansion, that is to say, in practice are tuned to an anti-friction bearing steel, particularly 100 Cr 6. The reason for this type of choice of the strain gauges is that when measuring forces it is generally desired to keep temperature-dependent influences upon the measurement signal small, and it was believed that this aim could be attained only by the use of strain gauges adapted to a material with the same coefficient of expansion. In cases where it was required additionally to measure the temperature of the anti-friction bearing, additional temperature sensors, for example in the form of stick-on thermo-elements, which increased the manufacturing outlay for the measuring apparatus, were employed. The above-indicated evaluation of the situation, that is to say the view that particular temperature sensors are required with devices of the type stated in order to permit the bearing temperatures also to be detected, has proved to be incorrect. Starting from this discovery, the underlying aim of the invention is to produce a device of the category in question, with which it is possible to detect both forces influencing the bearing and also the temperatures prevailing in the bearing without recourse to additional temperature sensors, that is to say solely by the use of strain gauges.

SUMMARY OF THE INVENTION

This aim is achieved according to the invention when one strain gauge of the two strain gauges connected as a half-bridge is adapted to a material with a different coefficient of expansion from the outer strain gauge of the half-bridge, whilst the signal, exhibiting a temperature-dependent direct-voltage fraction and a force-dependent alternating-voltage fraction, which is tapped from the center tapping of the half-bridge, is feedable to a filter to filter out the alternating-voltage fraction, and whilst the separated fractions are detectable each by an indicating instrument.

The device according to the invention, which breaks with a preconceived opinion, presents the advantage that, without increasing the outlay for production and material, both forces and temperatures can be measured with the same strain gauges of a measuring device.

BRIEF DESCRIPTION OF THE DRAWINGS

The invention is explained more fully below with reference to the accompanying drawing, wherein:

FIG. 1 shows diagrammatically the arrangement of the essential parts of a first device.

FIG. 2 shows diagrammatically the arrangement of the essential parts of a second device, and FIG. 3 shows diagrammatically the arrangement of the essential parts of a third device.

DETAILED DESCRIPTION OF THE PREFERRED EMBODIMENTS

The same reference numerals are employed in the figures of the drawing for mutually corresponding components.

In FIG. 1, 1 and 2 are two strain gauges, which are adapted to materials with widely different coefficients of expansion. Such strain gauges are available according to the catalogues published by various manufacturers. The use of one strain gauge adapted to steel and one to aluminum has been found particularly advantageous.

The signal appearing at the center tapping 3 of the half-bridge is fed on the one hand to an indicating instrument 4 and on the other hand to an indicating instrument 5, whilst a filter 6, constructed as an RC element with a resistor 7 and with a capacitor 8, is connected before the indicating instrument 5. The filter 6 serves to filter out the alternating-voltage fraction from the signal coming from the half-bridge.

The arrangement according to FIG. 2 corresponds largely to the arrangement according to FIG. 1. In the case of FIG. 2, the signals appearing at the center tapping 3 are amplified by an amplifier 9 before they pass to the indicating instrument 4 and to the filter 6. The use of such an amplifier will be unavoidable in practice as a rule.

The device according to FIG. 3 is a further development of the device according to FIG. 2. The device according to FIG. 3 differs from the device according to FIG. 2 in that a further amplifier 10 and a rectifier 11 are connected behind the filter 6. 12 is a recording indicating instrument.

I claim:

1. A device for measuring forces by means of at least one anti-friction bearing, the outer ring and/or inner ring of which are or is provided with strain gauges arranged at different measurement points, which serve to detect overroll extensions, whilst at least two strain gauges are connected as a half-bridge in each case, wherein one strain gauge (1) of the two strain gauges (1, 2) connected as a half-bridge is adapted to a material with a different coefficient of expansion from the other strain gauge (2) of the half-bridge, whilst the signal, exhibiting a temperature-dependent direct-voltage fraction and a force-dependent alternating-voltage fraction, which is tapped from the center tapping (3) of the half-bridge is feedable to a filter (6) to filter out the alternating-voltage fraction, and whilst the separated fractions are detectable each by an indicating instrument (4, 5, 12).

2. A device as claimed in claim 1, wherein an evaluation circuit exhibiting an amplifier (10) and a rectifier (11) is connected behind the filter (6).

3. A device as claimed in claim 1, wherein the filter (6) is formed by an RC element.

4. A device as claimed in claim 1, wherein the two strain gauges (1, 2) of the half-bridge are adapted to materials with widely different coefficients of expansion.

5. A device as claimed in claim 4, wherein one strain gauge (1) is adapted to steel and the other strain gauge (2) to aluminum.

6. A device as claimed in claim 1, wherein an amplifier (9) is arranged between the center tapping (3) of the half-bridge and the filter (6).

7. A device as claimed in claim 6, wherein an evaluation circuit exhibiting an amplifier (10) and a rectifier (11) is connected behind the filter (6).

8. A device as claimed in claim 6, wherein the filter (6) is formed by an RC element.

9. A device as claimed in claim 6, wherein the two strain gauges (1,2) of the half-bridge are adapted to materials with widely different coefficients of expansion.

10. A device as claimed in claim 6, wherein one strain gauge (1) is adapted to steel and the other strain gauge (2) to aluminum.

* * * * *